US008141936B2

(12) United States Patent
Salaverry

(10) Patent No.: US 8,141,936 B2
(45) Date of Patent: Mar. 27, 2012

(54) METHOD OF REDUCING DRAG ON THE OUTER SURFACE OF A VEHICLE

(75) Inventor: Peter C. Salaverry, Dallas, TX (US)

(73) Assignee: FastSkinz, Inc., Dallas, TX (US)

( * ) Notice: Subject to any disclaimer, the term of this patent is extended or adjusted under 35 U.S.C. 154(b) by 0 days.

(21) Appl. No.: 12/877,932

(22) Filed: Sep. 8, 2010

(65) Prior Publication Data

US 2010/0330329 A1 Dec. 30, 2010

Related U.S. Application Data

(63) Continuation of application No. 12/102,668, filed on Apr. 14, 2008, now Pat. No. 7,810,867.

(51) Int. Cl.
*B60J 9/00* (2006.01)

(52) U.S. Cl. .................................. 296/180.1

(58) Field of Classification Search ............... 296/180.1, 296/180.2, 154, 180.4, 181.5; 244/130
See application file for complete search history.

(56) References Cited

U.S. PATENT DOCUMENTS

| 1,342,733 | A | | 6/1920 | Austin | |
| 2,313,473 | A | | 3/1943 | Heacock et al. | |
| 3,604,661 | A | * | 9/1971 | Mayer, Jr. | 244/207 |
| 3,779,199 | A | * | 12/1973 | Mayer, Jr. | 440/38 |
| 4,256,304 | A | * | 3/1981 | Smith et al. | 473/451 |
| 4,284,302 | A | * | 8/1981 | Drews | 296/181.5 |
| 4,455,045 | A | * | 6/1984 | Wheeler | 296/181.5 |
| 4,736,912 | A | * | 4/1988 | Loebert | 244/130 |
| 4,883,556 | A | | 11/1989 | Leavitt, Sr. et al. | 156/273.3 |
| 4,940,622 | A | | 7/1990 | Leavitt, Sr. et al. | 428/137 |
| 4,955,709 | A | | 9/1990 | Smith | 351/46 |
| 5,000,508 | A | * | 3/1991 | Woods | 296/180.5 |
| 5,133,516 | A | * | 7/1992 | Marentic et al. | 244/130 |
| 5,289,997 | A | * | 3/1994 | Harris | 244/130 |
| 5,407,245 | A | * | 4/1995 | Geropp | 296/180.1 |
| 5,525,177 | A | | 6/1996 | Ross | 156/240 |
| 5,609,938 | A | * | 3/1997 | Shields | 428/138 |
| 5,651,233 | A | * | 7/1997 | Weder et al. | 53/397 |
| 5,734,990 | A | * | 4/1998 | Waring | 2/69 |
| 5,773,110 | A | * | 6/1998 | Shields | 428/40.1 |
| 5,803,409 | A | * | 9/1998 | Keefe | 244/206 |
| 5,830,529 | A | | 11/1998 | Ross | 427/152 |

(Continued)

OTHER PUBLICATIONS

Bushnell et al., *Viscous Drag Reduction in Boundary Layers*, 1990, American Institute of Aeronautics and Astronautics, Inc., Washington DC.

(Continued)

*Primary Examiner* — Kiran B. Patel
(74) *Attorney, Agent, or Firm* — Morgan, Lewis & Bockius LLP

(57) ABSTRACT

A vehicle with a drag-reducing outer surface. A method of reducing aerodynamic or hydrodynamic drag on a vehicle includes the steps of: providing an outer surface on a body of the vehicle, with the outer surface including spaced apart turbulence-inducing structures thereon. The structures cause boundary layer separation to be delayed along a length of the body, thereby reducing a drag coefficient of the body. A vehicle wrapping product for reducing aerodynamic or hydrodynamic drag on a vehicle includes an outer surface for applying onto an opaque portion of a body of the vehicle. The outer surface includes a plurality of structures which induce turbulence and thereby delay separation of a boundary layer along a length of the body, to thereby reduce a drag coefficient of the body.

6 Claims, 4 Drawing Sheets

U.S. PATENT DOCUMENTS

| | | | | |
|---|---|---|---|---|
| 5,925,437 | A * | 7/1999 | Nelson | 428/137 |
| 6,036,250 | A * | 3/2000 | Glatter | 296/21 |
| 6,068,328 | A * | 5/2000 | Gazdzinski | 296/181.5 |
| D441,539 | S * | 5/2001 | Streit | D5/3 |
| 6,258,429 | B1 | 7/2001 | Nelson | 428/42.1 |
| 6,551,029 | B2 * | 4/2003 | Shu et al. | 405/211 |
| 6,644,894 | B2 * | 11/2003 | Shu et al. | 405/211 |
| 6,732,972 | B2 * | 5/2004 | Malvestuto, Jr. | 244/12.3 |
| 6,849,007 | B2 * | 2/2005 | Morgan et al. | 473/378 |
| 7,018,501 | B1 | 3/2006 | Nelson | 156/253 |
| 7,070,850 | B2 | 7/2006 | Dietz et al. | 428/172 |
| 7,278,930 | B2 * | 10/2007 | Yokota et al. | 473/378 |
| 7,594,867 | B2 * | 9/2009 | Nardacci | 473/383 |
| 7,604,461 | B2 | 10/2009 | Bonnet | 416/235 |
| 7,644,977 | B2 * | 1/2010 | Drews | 296/181.5 |
| 2004/0137252 | A1 | 7/2004 | Bonnet et al. | 428/500 |
| 2005/0107189 | A1 * | 5/2005 | Ohama et al. | 473/371 |
| 2007/0284848 | A1 * | 12/2007 | Brownlie | 280/288.1 |
| 2008/0268258 | A1 | 10/2008 | Verma et al. | 428/421 |
| 2008/0272241 | A1 * | 11/2008 | Brulhart | 244/200.1 |
| 2009/0209367 | A1 * | 8/2009 | Stefan et al. | 473/373 |
| 2009/0256385 | A1 | 10/2009 | Salaverry | 296/180.1 |

OTHER PUBLICATIONS

Dale; *How NASA Helped Olympic Swimmers in Beijing*; Aug. 22, 2008; http://blogs.nasa.gov/cm/blog/Shana%27s-Blog/posts/post_1219426302896.html; 3 pages.

Holusha; *Business Technology Advances: 3M Coating Aids Yacht in Cup Effort*; Feb. 4, 1987; The New York Times; New York, NY; http://www.nytimes.com/1987/02/04/business/business-technology-advances-3m-coating-aids-yacht-in-cup-effort.html; 1 page.

Riedy; *All About the Bike*; Jul. 2, 2003; http://www.popsci.com/scitech/article/2003-07/all-about-bike; 2 pages.

Office Action, U.S. Appl. No. 29/306,684, Jun. 22, 2009, 5 pages.

Final Office Action, U.S. Appl. No. 29/306,684, Mar. 31, 2010, 7 pages.

Avery Dennison Corporation, *DOL 1000 Gloss Clear Cast Vinyl*, Product Data Bulletin, Nov. 7, 2005, 2 pages.

Avery Dennison Corporation, *DOL 4500 Conformable Perforated Window Film Overlaminate*, Product Data Bulletin, Mar. 28, 2007, 2 pages.

Avery Dennison Corporation, *MPI 1007 EZ Cast Vinyl Film for Digital*, Product Data Bulletin, Nov. 2, 2007, 2 pages.

Avery Graphics, *Perforated Window Film*, Product Data Bulletin, Mar. 26, 2002, 2 pages.

Clairborne, *Q&A*, The New York Times, Jan. 7, 2003, 1 page.

Nike, *Nike Designs Exclusive Highly Aerodynamic Swift Spin Body Suite for His 2002 Tour de France U.S. Postal Service Team*, Jul. 8, 2002, 3 pages.

Office Action, U.S. Appl. No. 12/102,668, Jan. 27, 2010, 7 pages.

Physlink.com, *Why do Dimples on a Golf Ball Allow it to Travel Farther?*, Apr. 4, 2008, 2 pages.

Popular Science, *New Speed Skating Suit*, 2007, 2 pages.

Scientific American, *How do Dimples in Golf Balls Affect their Flight?*, Sep. 19, 2005, 1 page.

Skinsuits and Boundary Layers, *What Do Skinsuits Have to Do With Boundary Layers?*, Jul. 15, 2002, 10 pages.

The (London) Independent, *Sharkskin Swimsuits Lead Hi-Tech Bid for Olympic Gold*, Mar. 17, 2000, 2 pages.

VeloNews Journal of Competitive Cycling, *Tour Tech-Its Gotta be the Suit*, Jul. 25, 2003, 3 pages.

Customize Your Car-Without Paint, www.importtuner.com/reviews/parts/0408impp_power_gear/skinz_wraps.html, downloaded May 6, 2010, pp. 1.

Delozier, Fastskinz Vehicle Wraps May Not Be an Easy Solution to Increased Miles per Gallon, inventorspot.com/articles/fastskinz_vehicle_wraps_may_not_be_easy_solution_increa..., downloaded May 6, 2010, pp. 1-4.

Fast Skinz Executive Summary, 2008, pp. 1-8.

Stewart, Fastskinz Test Drive: Can a Golf Ball Covering Improve MPGs?, Popularmechanics.com, 2010, popularmechanics.com/cars/news/4316702, downloaded May 6, 2010, pp. 1-3.

The Science and Theories Behind Drag Reducing Vehicle Wrap Material, Exclusively Distributed by SkinzWraps, Finds Support in Newest Episode of Discovery Channel's Mythbusters, Oct. 22, 2009, www.marketwire.com/mw/rel_us_print.jsp?id=1064119&lang=E1, downloaded May 6, 2010, pp. 1.

Voelcker, Today's Mileage Tip: Turn Your Car Into a Shark, www.greencarreports.com/blog/1018646_todays-mileage-tip-turn-your-car-into-a-shark, downloaded May 6, 2010, pp. 1-2.

\* cited by examiner

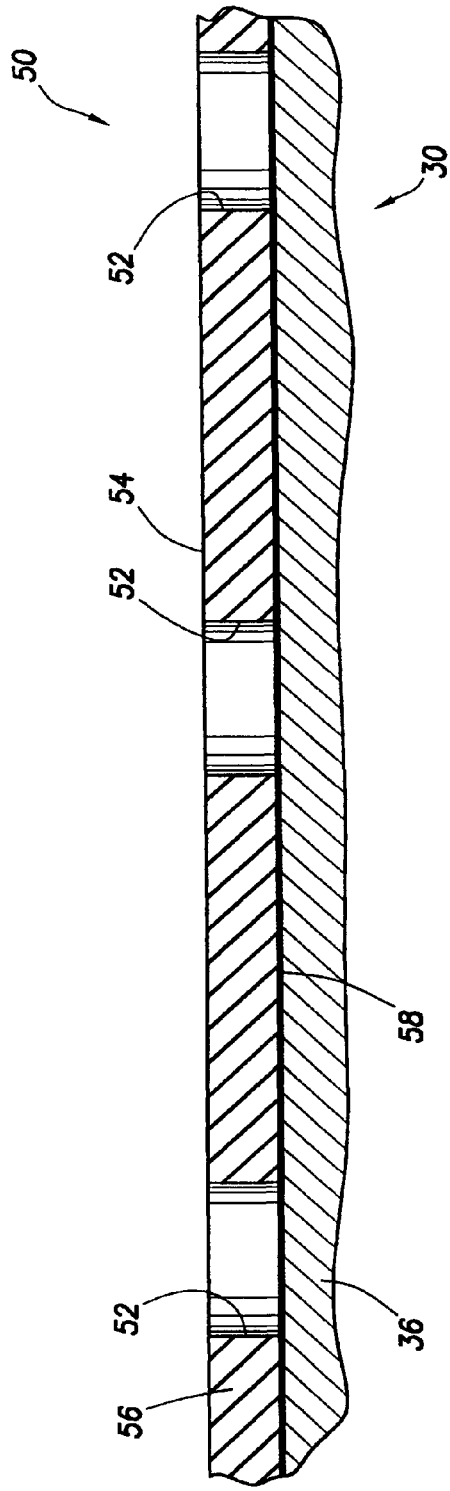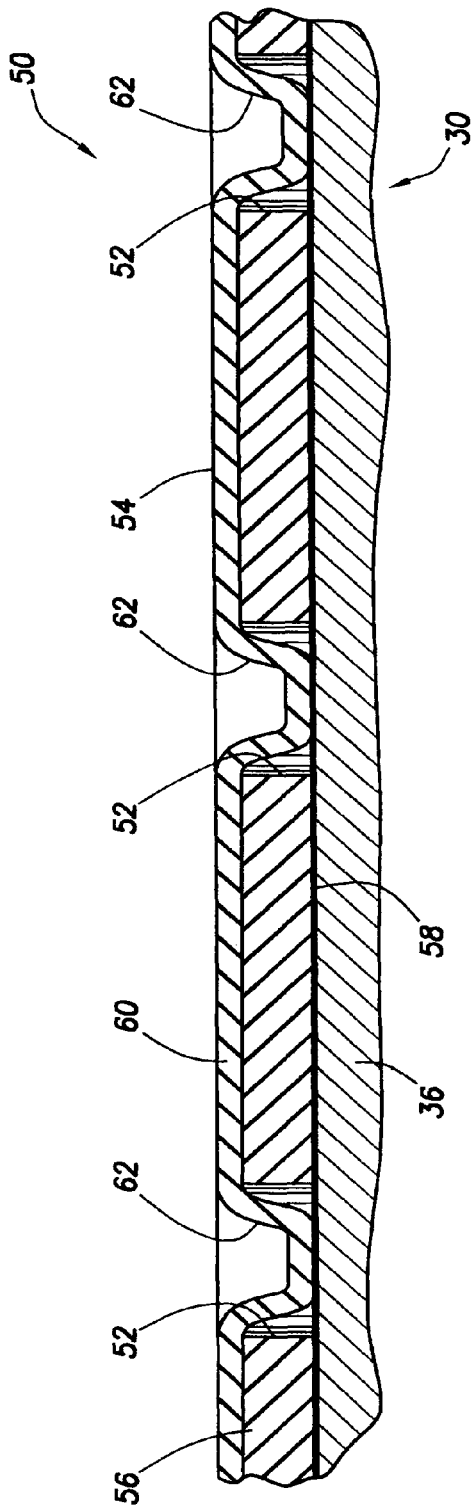

METHOD OF REDUCING DRAG ON THE OUTER SURFACE OF A VEHICLE

This application claims priority to the following U.S. Patent Application which is incorporated by reference herein in its entirety: U.S. patent application Ser. No. 12/102,668, filed Apr. 14, 2008 entitled "Vehicle with Drag-Reducing Outer Surface."

BACKGROUND

The present disclosure relates generally to the art of providing more efficient vehicles and, in an embodiment described herein, more particularly provides a vehicle with a drag-reducing outer surface.

A vehicle in motion through a fluid (liquid or gas, such as air) creates drag, which tends to resist the motion of the vehicle. Thus, drag slows the motion of the vehicle, or requires the use of increased energy to maintain or increase a speed of the vehicle.

In the past, vehicle designers have attempted to reduce the effects of drag on vehicles by shaping the vehicles so that less frontal area is exposed to the fluid, and/or so that the extent of a laminar boundary layer is maximized. These techniques are well known to those skilled in the arts of aerodynamics and hydrodynamics.

However, not all vehicles can be shaped like sports cars or high speed boats. Furthermore, it is uneconomical or otherwise undesirable to change the overall shape of an existing vehicle.

Therefore, it may be seen that improvements are needed in the art of reducing the drag coefficient of a vehicle. Such improvements would allow increased speed at a given level of energy expenditure, or would allow operation at a given speed while reducing the required energy expenditure.

SUMMARY

In the present specification, a technique is provided which solves at least one problem in the art. One example is described below in which drag is reduced by incorporating a turbulent boundary layer adjacent an outer surface of a body of a vehicle. Another example is described below in which the outer surface is provided on a vehicle wrapping product.

In one aspect, a method of reducing aerodynamic or hydrodynamic drag on a vehicle is provided. The method includes the steps of: providing an outer surface on a body of the vehicle, the outer surface including spaced apart turbulence-inducing structures thereon; and whereby the structures cause boundary layer separation to be delayed along a length of the body, thereby reducing a drag coefficient of the body.

In another aspect, a vehicle wrapping product for reducing aerodynamic or hydrodynamic drag on a vehicle is provided. The wrapping product includes an outer surface for applying onto an opaque portion of a body of the vehicle. The outer surface includes a plurality of structures which induce turbulence and thereby delay separation of a boundary layer along a length of the body, to thereby reduce a drag coefficient of the body.

These and other features, advantages, benefits and objects will become apparent to one of ordinary skill in the art upon careful consideration of the detailed description of representative embodiments hereinbelow and the accompanying drawings, in which similar elements are indicated in the various figures using the same reference numbers.

BRIEF DESCRIPTION OF THE DRAWINGS

FIG. 5 is an enlarged scale schematic cross-sectional view of the wrapping product on the vehicle of FIG. 2; and FIG. 6 is an enlarged scale schematic cross-sectional view of the wrapping product of FIG. 5 having an additional outer layer thereon.

DETAILED DESCRIPTION

It is to be understood that the various embodiments described herein may be utilized in various orientations, such as inclined, inverted, horizontal, vertical, etc., and in various configurations, without departing from the principles of the present disclosure. The embodiments are described merely as examples of useful applications of the principles of the disclosure, which are not limited to any specific details of these embodiments.

In the following description of the representative embodiments of the disclosure, directional terms, such as "above", "below", "upper", "lower", etc., are used for convenience in referring to the accompanying drawings. In general, "above", "upper", "upward" and similar terms refer to a vertical direction ascending from the earth's surface, and "below", "lower", "downward" and similar terms refer to a vertical direction descending from the earth's surface.

Figure 1:
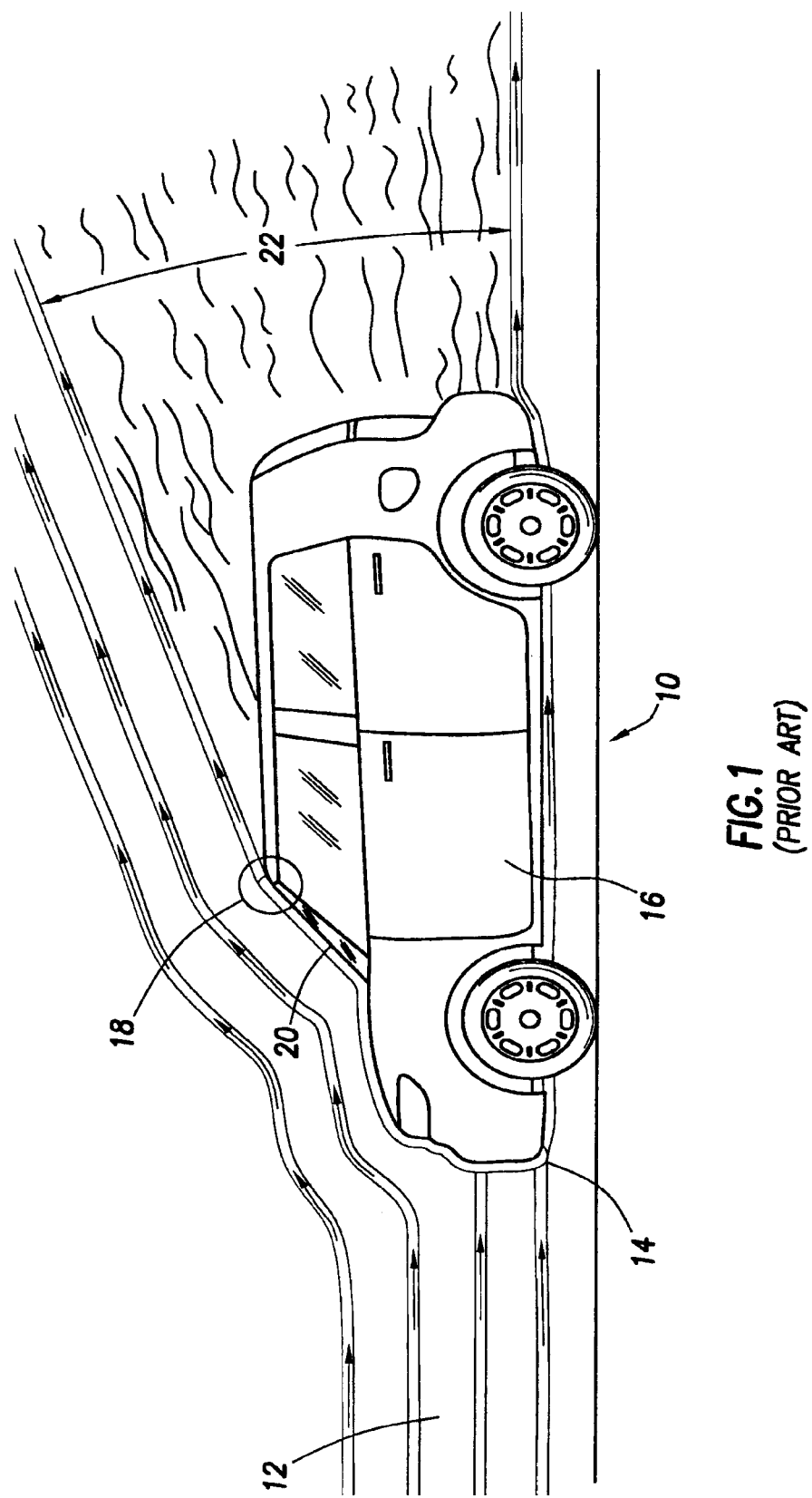
FIG. 1 is a side view of a prior art vehicle.

Representatively illustrated in FIG. 1 is a prior art vehicle 10. When the vehicle 10 moves forward relative to a fluid (such as air), a "flowfield" 12 is created about the vehicle.

In general, a laminar boundary layer 14 is formed adjacent a small portion of a body 16 of the vehicle 10. However, this laminar boundary layer 14 is easily disrupted by, for example, changes in contour of the body 16. In FIG. 1, the boundary layer 14 separates from the body 16 at a point of separation 18 which is located at an upper edge of a windshield 20 of the vehicle 10.

In many cases, the point of separation 18 occurs where the maximum thickness of the vehicle 10 begins. In nearly all cases, turbulence is created when the Reynolds number is over about $2\text{-}3 \times 10^5$.

Downstream of the point of separation 18, a relatively large turbulent wake 22 is formed in the flowfield 12. Pressure in this wake 22 is reduced relative to pressure in the flowfield 12 upstream of the point of separation 18. As a result, a pressure differential is created across the vehicle 10, which pressure differential tends to hinder forward motion of the vehicle.

This principle is embodied in the well-known equation for aerodynamic drag as follows:

$$\text{Drag} = (1/2) r u^2 C_d A \qquad (1)$$

wherein r is fluid density, u is fluid velocity, $C_d$ is the coefficient of drag, and A is frontal area.

Based on this equation, for a given fluid density and velocity, drag can be reduced by reducing the coefficient of drag, and by reducing the frontal area of a vehicle. If it is impractical or otherwise undesirable to reduce the frontal area of the vehicle, then drag can still be reduced by reducing the coefficient of drag.

At the Reynolds numbers typically found in vehicle motion (e.g., $Re < 1 \times 10^4$), viscous forces dominate the flow, and skin friction drag is less significant. Therefore, the coefficient of drag at lower Reynolds numbers can be substantially reduced without much concern for how skin friction is affected.

Figure 2:
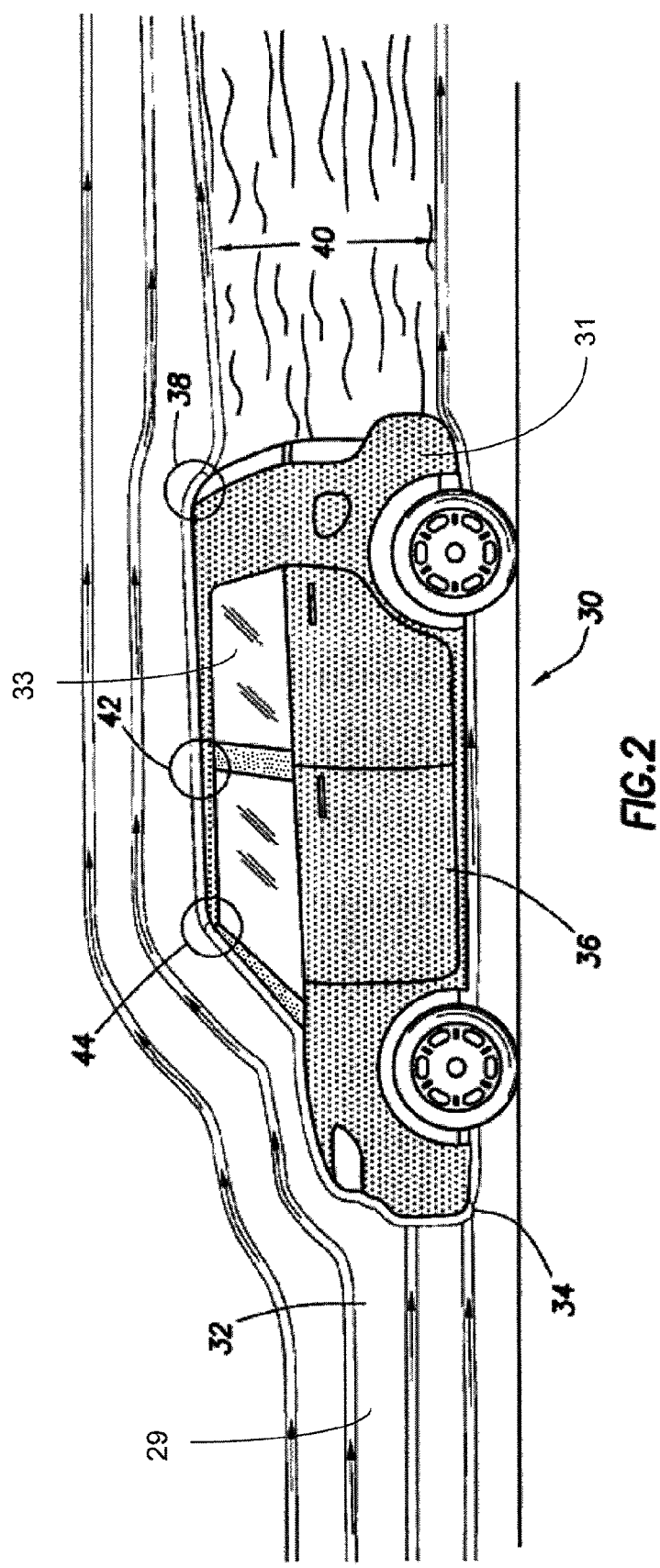
FIG. 2 is a side view of a vehicle which incorporates principles of the present disclosure.

Referring additionally now to FIG. 2, a vehicle 30 embodying principles of the present disclosure is representatively illustrated. In overall shape, the vehicle 30 is very similar to the prior art vehicle 10, however, the vehicle 30 of FIG. 2 includes important features which substantially reduce its coefficient of drag.

Note that a flowfield 32 is created in the fluid surrounding the vehicle 30, and that a laminar boundary layer 34 is formed adjacent a body 36 of the vehicle, similar to those for the vehicle 10 of FIG. 1. However, a point of separation 38 of the boundary layer for the vehicle 30 of FIG. 2 is located much farther downstream along the length of the body 36 as compared to the point of separation 18 for the vehicle 10 of FIG. 1.

As a result, the turbulent wake 40 is much smaller for the vehicle 30 of FIG. 2. This smaller wake 40 produces a decreased pressure differential across the body 36, and the coefficient of drag for the vehicle 30 is significantly reduced.

This result is achieved by providing a turbulent boundary layer 42 adjacent the body 36 of the vehicle 30. Specifically, the laminar boundary layer 34 is "tripped" into turbulence at a tripping point 44, which causes the boundary layer to remain adjacent the outer surface of the body for a greater distance downstream along the length of the body 36, thereby delaying separation of the boundary layer from the body.

Figure 3:
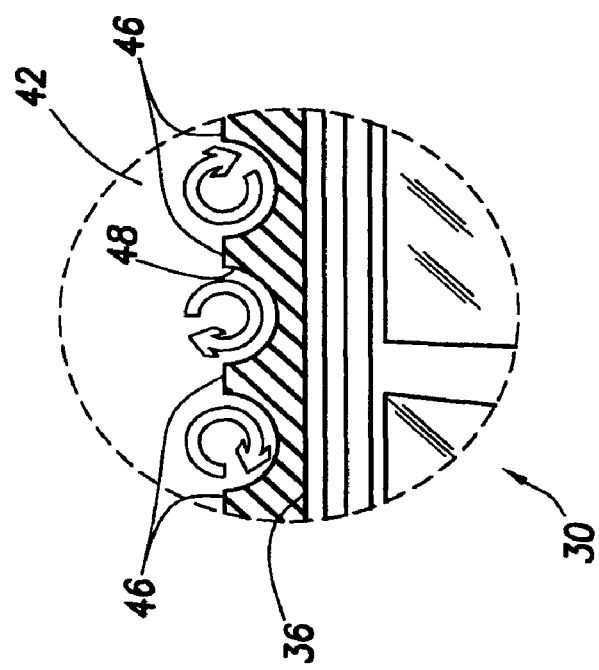
FIG. 3 is an enlarged scale schematic view of a turbulent boundary layer on the vehicle of FIG. 2.

Referring additionally now to FIG. 3, an enlarged scale view of the turbulent boundary layer 42 is representatively illustrated. In this view it may be seen that turbulence-inducing structures 46 are provided on an outer surface 48 of the vehicle 30 exposed to the flowfield 32.

The structures 46 function to induce turbulence in the boundary layer 42 at Reynolds numbers much less than 2-3.times.10.sup.5. These turbulence-inducing structures 46 create the high energy turbulent boundary layer 42, which is much more able to resist the adverse pressure gradients present in the flowfield 32 about the body 36 as compared to the laminar boundary layer 34. Consequently, the point of separation 38 is displaced substantially rearward of the onset of maximum thickness of the body 36.

As depicted in FIG. 3, the structures 46 comprise upstanding elements on the body 36 of the vehicle 30. However, the turbulence-inducing structures could instead be recesses on the body 36. Furthermore, the structures could be integrally formed with the body 36, or they could be applied to the body after the body is manufactured.

Figure 4:
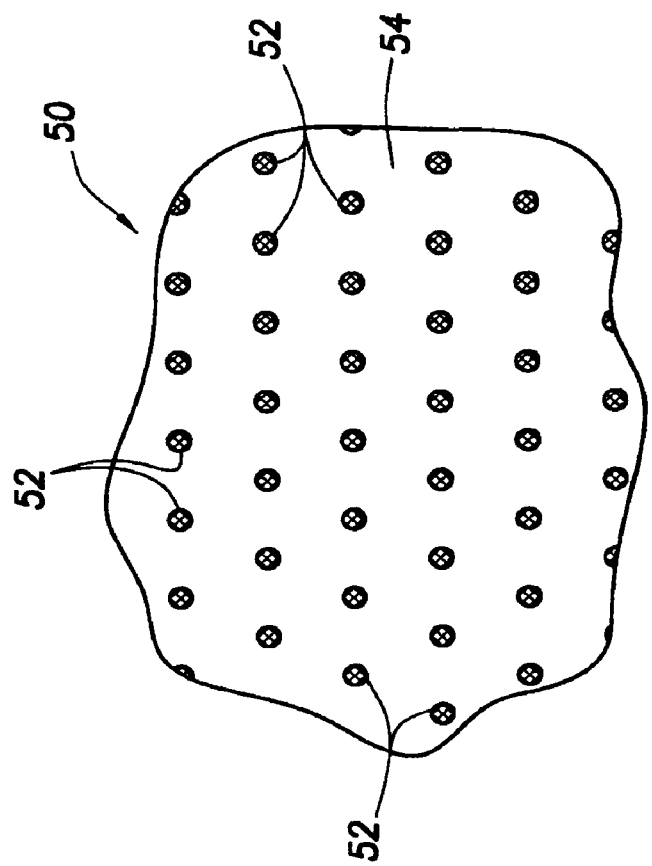
FIG. 4 is a reduced scale outer view of a wrapping product for use on the vehicle of FIG. 2.

As an example of the latter alternative, in FIG. 4 a vehicle wrapping product 50 is representatively illustrated, apart from the vehicle 30. This wrapping product 50 is configured to be applied to the body 36 after the body is manufactured. For example, the wrapping product 50 could be applied to an existing vehicle, or the wrapping product could be applied to the body 36 as part of the vehicle manufacturing process.

The wrapping product 50 is provided in sheets (preferably rolled up for convenient transport and handling). Perforations 52 are formed in the sheets to provide the turbulence-inducing structures 46 on an outer surface 54 of the wrapping product 50.

Referring additionally now to FIG. 5, an enlarged scale cross-sectional view of one example of the wrapping product 50 is representatively illustrated. In view, the wrapping product 50 has been adhesively secured onto the body 36 of the vehicle 30.

As depicted in FIG. 5, the wrapping product 50 includes a perforated layer 56 in which the perforations 52 are formed. The perforations 52 are preferably dimensioned and appropriately spaced apart so that the turbulent boundary layer 42 is formed adjacent the body 36 when the body is in motion through the flowfield 32.

For example, the perforations 52 preferably have a diameter of approximately 0.17 inch, are offset 60% line-to-line, and are spaced 1 inch center-to-center between vertically aligned perforations as depicted in FIG. 5. However, it should be clearly understood that other diameters, offsets and spacings may be used, and other shapes of perforations (such as squares, hexagons, octagons, ovals, etc.) may be used, without departing from the principles of this disclosure.

The perforated layer 56 is preferably made of an opaque vinyl material, with an adhesive 58 on one side for adhering the layer onto the body 36. The perforated layer 56 may also be provided with channels on its underside for releasing air from between the body and the perforated layer when the perforated layer is adhered onto the body 36.

The material of which the perforated layer 56 is made may be conventional vehicle wrap material designed for use on non-glass surfaces of vehicles. This material may then be perforated to form the perforated layer 56.

The wrapping product 50 is preferably applied only to opaque non-glass portions 31 of the body 36 (as opposed to the glass portions 33). For example, the wrapping product 50 may be applied to rigid metal or molded plastic portions of the body. In addition, the wrapping product 50 is preferably applied to at least 20% of the exterior of the body for minimal effectiveness, is more preferably applied to at least 30% of the exterior of the body for increased effectiveness, and is most preferably applied to all opaque portions of the body 36 for maximum effectiveness.

One beneficial feature of the wrapping product 50 is that the body 36 can be viewed from an exterior of the perforated layer 56 through the perforations 52. This provides an additional aesthetic design opportunity.

For example, the perforated layer 56 could be provided in a color which contrasts with or complements a color of the body 36. Alternatively, the perforated layer 56 could be provided in a clear material, in which case the color of the body 36 could be visible through the material of the perforated layer.

Referring additionally now to FIG. 6, a schematic cross-sectional view of a more preferred version of the wrapping product 50 is representatively illustrated. In this version, another layer 60 is provided over the perforated layer 56.

Preferably, the outer layer 60 is made of a laminate (a clear vinyl material), so that the perforated layer 56 and the body 36 are visible through the layer 60. However, it will be appreciated that it is not necessary for the layer 60 to be clear in keeping with the principles of this disclosure.

If the outer layer 60 is made of a laminate, the laminate is preferably not optically-clear as that term is understood in the vehicle wrapping industry. Instead, since the wrapping product 50 is preferably applied to opaque portions of the body 36, the layer 60 can be made of material which is less expensive than optically-clear material.

The outer layer 60 is preferably made of a conventional laminate material which is designed for use on non-glass surfaces of vehicles (known to those skilled in the art as vehicle wrap laminate). This vehicle wrap laminate material is clear, but is not optically-clear.

The outer layer 60 is preferably laminated with the perforated layer 56 prior to applying the wrapping product 50 to the vehicle 30. However, the outer layer 60 could be applied on the perforated layer 56 after the perforated layer has been applied to the body 36, if desired.

Recesses 62 are formed in the outer layer 60 when the outer layer is laminated or otherwise applied onto the perforated layer 56. That is, the material of the outer layer 60 extends into the perforations 52, thereby forming the recesses 62.

In this configuration, the recesses 62 comprise the structures 46 which induce turbulence in the boundary layer 42. Note that, instead of or in addition to the recesses 62, projections or other types of turbulence-inducing structures may be formed on the wrapping product 50 in keeping with the principles of this disclosure.

Although an automobile has been used herein as an example of a vehicle which can incorporate principles of this disclosure, it will be appreciated that other types of vehicles can also incorporate principles of this disclosure. For example, boats and any other type of vehicle which would benefit from a reduction in drag coefficient may incorporate principles of this disclosure.

It may now be fully appreciated that the above disclosure provides many benefits to the art of reducing drag in vehicles. These benefits are achieved in an economical manner, without requiring substantial changes to the overall shape of a vehicle, and can be useful for existing and newly manufactured vehicles.

In one aspect, a method of reducing aerodynamic or hydrodynamic drag on a vehicle 30 is provided by this disclosure. The method includes the steps of: providing an outer surface 48, 54 on a body 36 of the vehicle 30, the outer surface 48, 54 including spaced apart turbulence-inducing structures 46, 52, 62 thereon. The structures 46, 52, 62 cause boundary layer separation to be delayed along a length of the body 36, thereby reducing a drag coefficient of the body 36.

The body 36 may be rigid. The rigid body 36 may comprise a metal material.

The outer surface 48, 54 providing step may include applying a perforated layer 56 on an exterior of the body 36. The body 36 may be opaque.

The applying step may include applying the perforated layer 56 on a non-glass portion of the body 36. The exterior of the body 36 may be visible through perforations 52 in the perforated layer 56.

The providing step may include applying a laminate 60 over the perforated layer 56. The applying step may include applying the perforated layer 56 on at least 20% or 30% of the exterior of the body 36.

Also provided by the above disclosure is a vehicle wrapping product 50 for reducing aerodynamic or hydrodynamic drag on a vehicle 30. The wrapping product 50 includes an outer surface 48, 54 for applying onto an opaque portion of a body 36 of the vehicle 30. The outer surface 48, 54 includes a plurality of structures 46, 52, 62 which induce turbulence and thereby delay separation of a boundary layer 42 along a length of the body 36, to thereby reduce a drag coefficient of the body 36.

The structures 46, 52, 62 may be dimensioned in a manner that a turbulent boundary layer 42 is created adjacent the outer surface 48, 54 when the body 36 displaces relative to a fluid 29.

The outer surface 48, 54 may be formed on a laminate 60. The wrapping product 50 may also include a perforated layer 56 adjacent the laminate 60.

Each of the laminate 60 and the perforated layer 56 may comprise a vinyl material. The perforated layer 56 may be opaque. The perforated layer 56 may include perforations 52 therein, with each perforation having a dimension of approximately 0.19 inch.

The structures 62 may be due to the laminate 60 being recessed into perforations 52 in the perforated layer 56.

The wrapping product 50 may include a perforated layer 56 having perforations 52 therein dimensioned in a manner that a turbulent boundary layer 42 is created adjacent the outer surface 48, 54 when the body 36 displaces relative to a fluid.

The structures 46, 52, 62 may be dimensioned in a manner that the boundary layer is tripped from laminar 34 to turbulent 42 when the body 36 displaces relative to a fluid.

Of course, a person skilled in the art would, upon a careful consideration of the above description of representative embodiments, readily appreciate that many modifications, additions, substitutions, deletions, and other changes may be made to these specific embodiments, and such changes are within the scope of the principles of the present disclosure. Accordingly, the foregoing detailed description is to be clearly understood as being given by way of illustration and example only, the spirit and scope of the present invention being limited solely by the appended claims and their equivalents.

What is claimed is:

1. A method of reducing drag resistance for a vehicle moving through a fluid, the vehicle having a body with an outer surface having one or more non-glass portions, the method comprising the steps of:
   providing a perforated sheet material having a plurality of perforations configured to induce turbulence in the fluid flowing over the vehicle;
   providing a second sheet material;
   applying the second sheet material to the perforated sheet material to form an outer layer; and
   applying the perforated sheet material to the non-glass portions of the body of the vehicle.

2. The method of claim 1, wherein the second sheet material is transparent such that a portion of the outer surface of the body is visible through perforations in the perforated sheet material.

3. The method of claim 1, wherein the applying step further comprises applying the perforated sheet material to a majority of the non-glass portions of the body.

4. The method of claim 1, wherein the vehicle is an automobile.

5. The method of claim 1, wherein a non-glass portion of the body comprises a metal material.

6. The method of claim 1, wherein a non-glass portion of the body is opaque.

* * * * *